(12) United States Patent
Yagyu et al.

(10) Patent No.: US 7,734,170 B2
(45) Date of Patent: Jun. 8, 2010

(54) IMAGING APPARATUS

(75) Inventors: Genta Yagyu, Hyogo (JP); Ichiro Tsujimura, Osaka (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 11/876,366

(22) Filed: Oct. 22, 2007

(65) Prior Publication Data
US 2008/0159730 A1 Jul. 3, 2008

(30) Foreign Application Priority Data
Dec. 27, 2006 (JP) .............................. 2006-351871

(51) Int. Cl.
*G03B 13/06* (2006.01)
*G03B 13/08* (2006.01)
*H04N 5/222* (2006.01)

(52) U.S. Cl. ...................... 396/386; 396/385; 396/271; 348/333.09; 348/333.08; 348/341; 348/344

(58) Field of Classification Search ................ 396/385, 396/386, 271, 374; 348/333.08–333.09, 348/341, 344
See application file for complete search history.

(56) References Cited

U.S. PATENT DOCUMENTS

| | | | | |
|---|---|---|---|---|
| 3,590,683 A | * | 7/1971 | Hiruma | 396/383 |
| 3,651,735 A | * | 3/1972 | Hiruma | 396/383 |
| 5,319,405 A | * | 6/1994 | Ikemori | 396/353 |
| 5,557,358 A | * | 9/1996 | Mukai et al. | 396/296 |
| 6,041,195 A | * | 3/2000 | Honda et al. | 396/429 |
| 7,440,692 B2 | * | 10/2008 | Okumura | 396/374 |
| 2004/0169758 A1 | * | 9/2004 | Murashima et al. | 348/333.08 |

FOREIGN PATENT DOCUMENTS

| | | |
|---|---|---|
| JP | 63-160539 | 10/1988 |
| JP | 2000-13663 | 1/2000 |
| JP | 2001-133846 | 5/2001 |
| JP | 2006-11025 | 1/2006 |

* cited by examiner

*Primary Examiner*—W. B. Perkey
*Assistant Examiner*—Bret Adams
(74) *Attorney, Agent, or Firm*—Oblon, Spivak, McClelland, Maier & Neustadt, L.L.P.

(57) ABSTRACT

There is provided an imaging apparatus having a viewfinder optical system; a first image sensor; a photometric sensor; and optical path changing means. The viewfinder optical system has a first reflective surface that reflects a monitoring luminous flux, and the first reflective surface changes a reflection angle of the monitoring luminous flux. A change in a reflection angle of the first reflective surface causes a course of the monitoring luminous flux to be switched between a first optical path and a second optical path. In a case of second optical path, a travel direction is changed with the optical path changing means placed on the second optical path, causing a photometric processing to be performed using the first image sensor, while in a case of the first optical path, the photometric processing is performed using the photometric sensor.

20 Claims, 11 Drawing Sheets

IMAGING APPARATUS

BACKGROUND OF THE INVENTION

1. Field of the Invention

The present invention relates to an imaging apparatus such as digital cameras.

2. Description of Related Art

As to single-lens reflex cameras, technologies of having a live view function are in existence. The live view function is adapted to display subject-related time-series images on a liquid crystal display unit etc. sequentially, in other words, to display subject images on the liquid crystal display unit etc. in a moving image-mannered display mode.

In Japanese Patent Application Publication (KOKAI) No. 2000-13663 (Patent Document 1) and Japanese Patent Application Publication (KOKAI) No. 2006-11025 (Patent Document 2), for instance, there is described one technology adapted to implement a live view function by splitting a luminous flux received from a subject into one component traveling toward an image sensor and the other component traveling toward a viewfinder window in such a manner as to place a beam splitter or a half mirror in an optical path of a viewfinder optical system, causing the one component to be guided to an image sensor.

However, with respect to the technology of this type, a luminous flux received from the subject is split into the above two types of components by the beam splitter or the half mirror, resulting in a problem of causing the subject image viewed through the viewfinder system as one component to have darkness.

A technology described in Japanese Patent Application Publication (KOKAI) No. 2001-133846 (Patent Document 3) is also obtainable as one technology effective in eliminating the above problem.

In the technology described in Patent Document 3, an image sensor for live viewing is provided independently of an image sensor for taking pictures (or for still image recording), and a movable reflection mirror movable to and away from a viewfinder optical path in the vicinity of an eyepiece is also provided in the above viewfinder optical path. Then, there is taken one configuration that permits, by moving the reflection mirror to and away from the viewfinder optical path, selective switching between a condition where the luminous flux received from the subject travels toward the eyepiece and a condition where the luminous flux received from the subject reaches the image sensor for live viewing.

SUMMARY OF THE INVENTION

However, the technology described in Patent Document 3 needs to provide the movable reflection mirror movable to and away from the viewfinder optical system on the optical path in the vicinity of the eyepiece of the viewfinder optical system, in addition to the existing optical components. Particularly, in cases where placement of more than one lens as the eyepiece is required for diopter adjustment and so on, a large number of components are supposed to be placed on the optical path in the vicinity of the eyepiece, resulting in a great difficulty in avoiding an increase in apparatus size with respect to a pertinent optical path portion.

The present invention provides an imaging apparatus that enables live viewing to be realized without further providing a movable reflection mirror movable to and away from an optical path of a viewfinder optical system, and at the same time, may provide visual confirmation of a subject image through an optical viewfinder in a bright condition.

A need also exists for the imaging apparatus to perform appropriate photometric processing.

As such, the present invention also provides a technology adaptable to implement appropriate photometric processing in the imaging apparatus of the above novel type.

According to an embodiment of the present invention, there is provided an imaging apparatus, which includes a viewfinder optical system adaptable to guide, toward a viewfinder window, a monitoring luminous flux, which is included in a luminous flux received from an optical imaging system, specifically, a luminous flux having been reflected from a main reflective surface; a first image sensor for generating an image signal by detecting the above monitoring luminous flux; a photometric sensor; and optical path changing means adaptable to change an optical path. The viewfinder optical system has a first reflective surface that reflects the monitoring luminous flux, and the first reflective surface is adaptable to change a reflection angle of the monitoring luminous flux. A change in the reflection angle of the first reflective surface causes a course of the above monitoring luminous flux to be switched between a first optical path reflected from the first reflective surface toward the viewfinder window and a second optical path reflected from the first reflective surface toward the above first image sensor. When the course of the monitoring luminous flux takes the second optical path, a travel direction of the second optical path is changed with the optical path changing means placed on the above optical path, causing photometric processing to be performed using the above first image sensor placed on the second optical path resulting from a change in the travel direction. When the course of the monitoring luminous flux takes the first optical path, the photometric processing is performed using the photometric sensor placed in the vicinity of the first optical path.

According to another embodiment of the present invention, there is provided an imaging apparatus, which includes a viewfinder optical system adaptable to guide, toward a viewfinder window, a monitoring luminous flux, which is included in a luminous flux received from an optical imaging system, specifically, a luminous flux having been reflected from a main reflective surface; a first image sensor for generating an image signal by detecting the above monitoring luminous flux; a photometric sensor; and optical path changing means adaptable to change an optical path. The viewfinder optical system has a first reflective surface that reflects the monitoring luminous flux, and the first reflective surface is adaptable to change a reflection angle of the monitoring luminous flux. A change in the reflection angle of the monitoring luminous flux causes a course of the monitoring luminous flux to be switched between a first optical path reflected from the first reflective surface toward the viewfinder window and a second optical path reflected from the first reflective surface toward the first image sensor. When the course of the monitoring luminous flux takes the first optical path, photometric processing is performed using the photometric sensor for detecting the luminous flux whose travel direction has been changed with the optical path changing means placed in the vicinity of the first optical path. When the course of the monitoring luminous flux takes the second optical path, the photometric processing is performed using the first image sensor placed on the second optical path.

These and other features and aspects of the invention are set forth in detail below with reference to the accompanying drawings in the following detailed description of the embodiments.

DETAILED DESCRIPTION OF THE EMBODIMENTS

Hereinafter, embodiments of the present invention are described with reference to the accompanying drawings.

1. First Embodiment

<1-1. Outline of Configuration>

Figure 1:
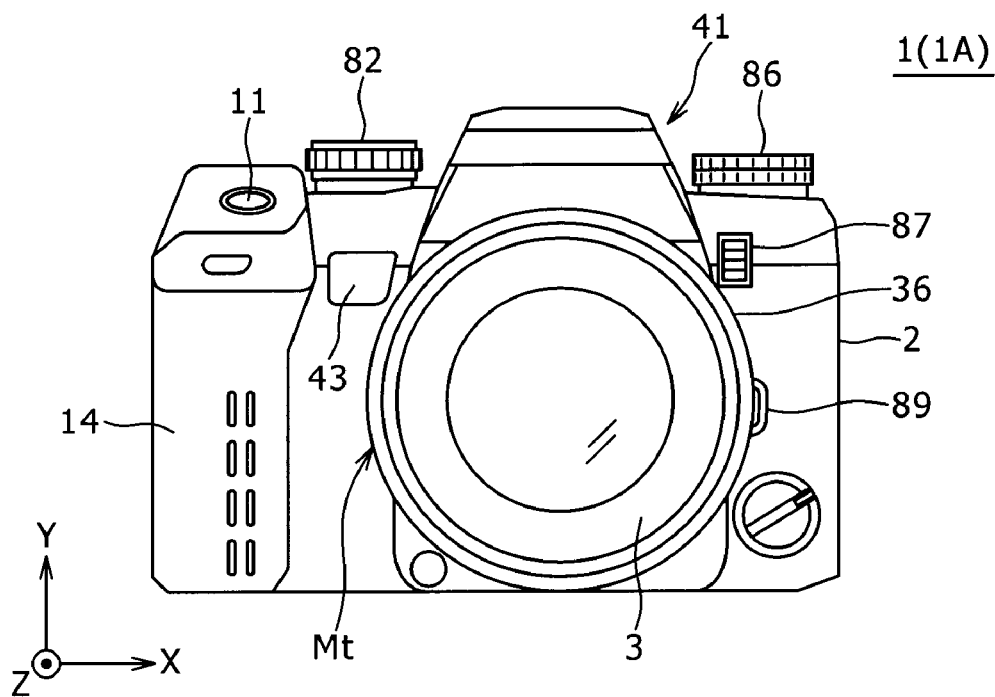
FIG. 1 is a front view showing an external front configuration of an imaging apparatus according to a first embodiment.
Figure 2:
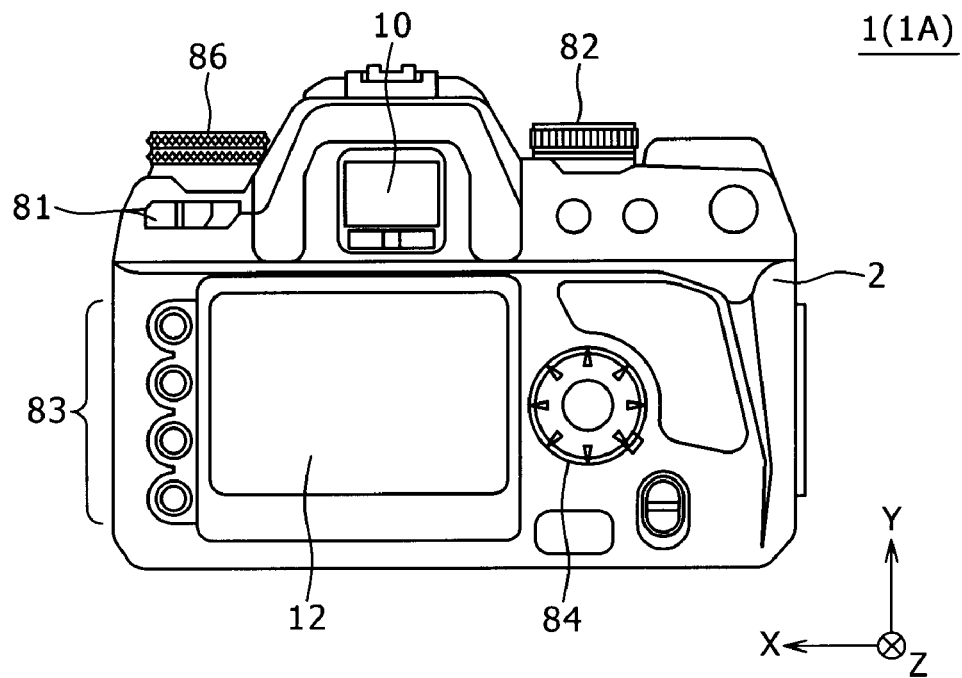
FIG. 2 is a rear view showing an external rear configuration of the imaging apparatus.

FIGS. 1 and 2 are views showing an external configuration of an imaging apparatus 1(1A) according to a first embodiment of the present invention. Specifically, FIG. 1 is a front view showing an external front configuration of the imaging apparatus 1, and FIG. 2 is a rear view showing an external rear configuration of the imaging apparatus 1. The imaging apparatus 1 shown is provided in the form of a lens-exchangeable single-lens reflex digital camera.

As shown in FIG. 1, the imaging apparatus 1 has a camera body unit (a camera body) 2. An exchangeable imaging lens unit (an exchangeable lens) 3 is detachably mounted to the camera body unit 2.

The imaging lens unit 3 is mainly configured with components such as a lens barrel 36 and lens groups 37 (See FIG. 3) housed together with an aperture in the lens barrel 36. Lenses such as a focus lens adapted to change a focal position by moving in an optical axis direction are included in the lens groups 37 (an image taking optical system).

The camera body unit 2 has, in an approximate center of the front, an annular mount Mt to which the imaging lens unit 3 is mounted, and, in the vicinity of the annular mount Mt, an attachment/detachment button 89 used to attach or detach the imaging lens unit 3.

The camera body unit 2 also has, on an upper left of the front, a mode setting dial 82, and, on an upper right of the front, a control-value setting dial 86. Operating the mode setting dial 82 gives effect to setting (or switching) of various camera modes (including those such as various shooting modes (or a figure image shooting mode, a scenic image shooting mode and a full-automatic shooting mode etc.), a playback mode adapted to play back a taken image, and a communication mode adapted to effect data communications with an external apparatus). Operating the control-value setting dial 86 gives effect to setting of control values with respect to the various shooting modes.

The camera body unit 2 also has, on a left end of the front, a grip unit 14 useful for letting a photographer grasp. A release button 11 for giving an exposure start instruction is provided on an upper surface of the grip unit 14. A battery chamber and a card chamber are provided within the grip unit 14. Four pieces of AA-sized dry cells, for instance, are housed as a camera power source in the battery chamber. A memory card 90 (See FIG. 3) adapted to record image data of the taken image is supposed to be detachably housed in the card chamber.

The release button 11 is of two-stage detection type adaptable to detect two pressed states, a half-pressed state (an S1 state) and a full-pressed state (an S2 state). When the release button 11 is pressed to the half to obtain the S1 state, setting-up, such as AF control operation and AE control operation, for acquiring a subject-related still image for recording, or an image-to-be-taken under consideration, goes into effect. When the release button 11 is further forced in to obtain the S2 state, shooting of the image-to-be-taken under consideration, in other words, a series of operations from exposing with respect to a subject image, i.e., a light image of the subject, using an image sensor 5 (described later) till predetermined image processing given to an image signal resulting from the exposing, is performed.

Referring to FIG. 2, the camera body 2 has, in an approximately center top of the rear, a viewfinder window (an eyepiece window) 10. The photographer may put framing into effect by visually confirming the subject light image received from the imaging lens unit 3 in such a manner as to look in at the viewfinder window 10. In other words, the framing may be performed using an optical viewfinder.

It is noted that the imaging apparatus 1 according to the first embodiment may also provide framing using a live view image displayed on a rear monitor 12 (described later). It is also noted that switching between a framing operation with the optical viewfinder and a framing operation with a displayed live view image may be given by an operator in such a manner as to turn a switching dial 87. Operations such as the switching are described later in detail.

Referring to FIG. 2, the camera body unit 2 also has, in an approximate center of the rear, the rear monitor 12. The rear monitor 12 is provided in the form of a color liquid crystal display (LCD), for instance. The rear monitor 12 is adaptable to display a menu display for setting of conditions such as shooting conditions, and also, to play back the taken image contained in the memory card 90 during the playback mode. Further, when no framing with the optical viewfinder but the framing with the displayed live view image is selected by the operator, more than one time-series image, or moving image, acquired by an image sensor 7 (described later) is displayed as the live view images on the rear monitor 12.

A main switch 81 is provided on the upper left of the rear monitor 12. The main switch 81 is composed of a two-contact slide switch. Thus, placing a contact to an "OFF" position at the left of the contact turns the power off, while placing the contact to an "ON" position at the right of the contact turns the power on.

A direction select key 84 is provided on the right of the rear monitor 12. The direction select key 84 has a circular operation button and is adapted to detect pressing operations with respect to the operation button in four directions, up, down, left and right, as well as in other four directions, upper right, upper left, lower right and lower left, respectively. It is noted that the direction select key 84 is also adapted to detect a pressing operation with respect to a center push button, independently of the pressing operations in the above eight directions.

A setting button group 83 composed of more than one button used for operations such as setting of the menu display and deletion of the image is provided on the left of the rear monitor 12.

<1-2. Functional Block>

Figure 3:
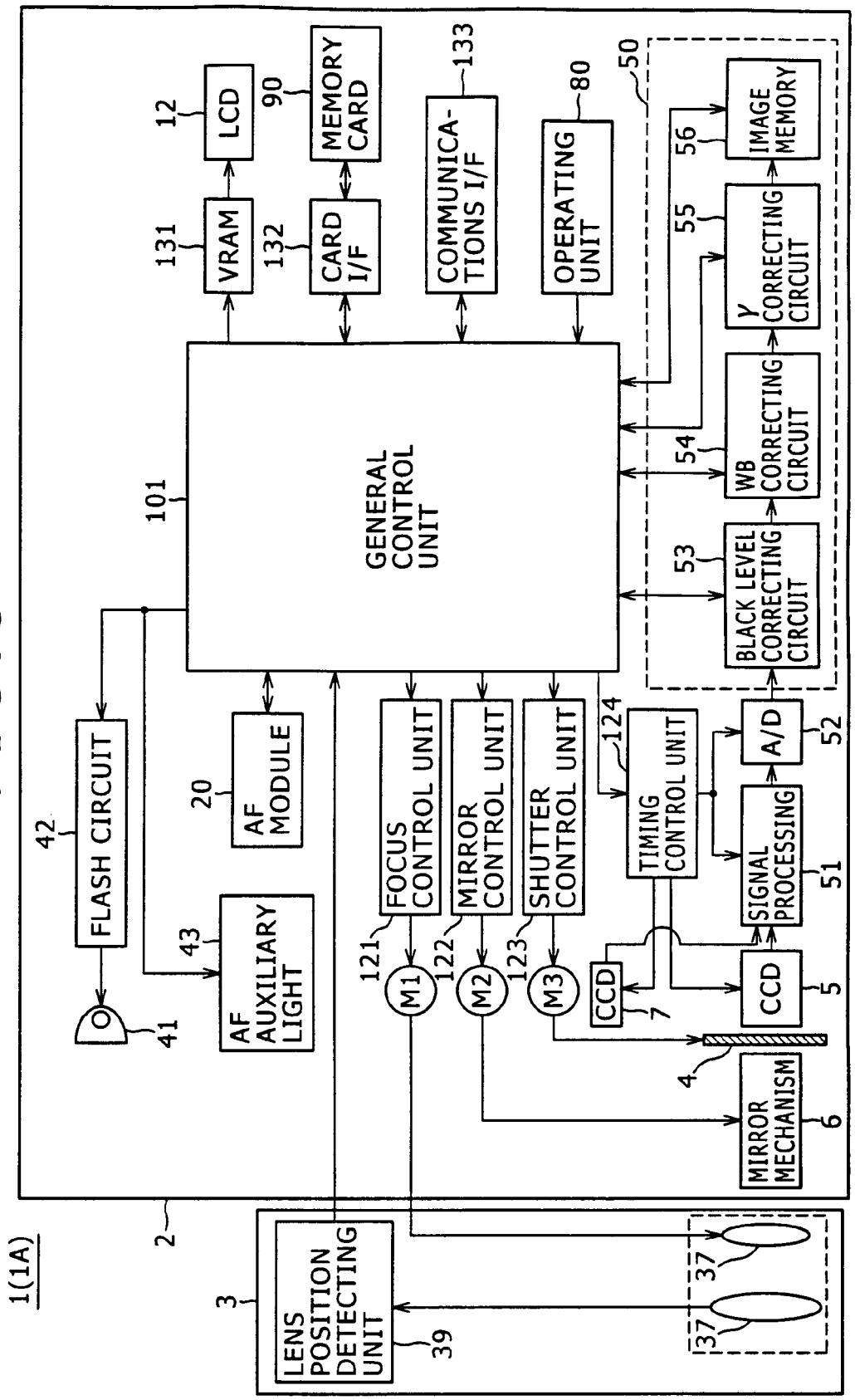
FIG. 3 is a block diagram showing functions of the imaging apparatus.

Outline of functions of the imaging apparatus 1 is now described with reference to FIG. 3. FIG. 3 is a block diagram showing a functional configuration of the imaging apparatus 1.

As shown in FIG. 3, the imaging apparatus 1 has components such as an operating unit 80, a general control unit 101, a focus control unit 121, a mirror control unit 122, a shutter control unit 123, a timing control circuit 124 and a digital signal processing circuit 50.

The operating unit 80 is configured with components such as various buttons including the release button 11 (See FIG. 1) and switches. In response to input operations given by a user to the operating unit 80, various operations are realized by the general control unit 101.

The general control unit 101 is provided in the form of a microcomputer, and mainly has components such as a CPU, a memory and a ROM. The general control unit 101 is to implement various functions by executing, after reading out a program stored in the ROM, the read-out program with the CPU. For instance, the general control unit 101 performs a focusing control operation for controlling a focus lens position in cooperation with an AF module 20 and the focus control unit 121 etc. The general control unit 101 provides the AF operation using the focus control unit 121 depending on a subject in-focus condition detected by the AF module 20. It is noted that the AF module 20 is adaptable to detect, using light having reached through a mirror mechanism 6, the subject in-focus condition according to an in-focus condition detecting technique based on a phase difference (retardation) scheme etc.

The focus control unit 121 is to shift the focus lens included in the lens groups 37 of the imaging lens unit 3 in such a manner as to drive a motor M1 by generating a control signal based on signals fed from the general control unit 101. The focus lens position is detected by a lens position detecting unit 39 included in the imaging lens unit 3, causing data representing the focus lens position to be sent to the general control unit 101. Thus, the units such as the focus control unit 121 and the general control unit 101 are adapted to give control of focus lens movement in the optical axis direction.

The mirror control unit 122 is to control switching between a state (a mirror-up state) where the mirror mechanism 6 is in a position of refuge from an optical path and a state (a mirror-down state) where the optical path is intercepted by the mirror mechanism 6. The mirror control unit 122 makes switching between the mirror-up state and the mirror-down state in such a manner as to drive a motor M2 by generating a control signal based on signals fed from the general control unit 101.

The shutter control unit 123 is to control opening and closing of a shutter 4 in such a manner as to drive a motor M3 by generating a control signal based on signals fed from the general control unit 101.

The timing control circuit 124 is to perform timing control with respect to the image sensor 5 etc.

The image sensor 5 is to generate an image signal (a recording image signal) related to the image-to-be-taken under consideration by converting the subject light image into electric signals by the action of photoelectric conversion. Herein, the image sensor 5 may be a CCD sensor (simply also referred to as a CCD). The image sensor 5 is also interpreted as an image sensor for acquiring the recording image.

The image sensor 5 gives, in response to drive control signals including a charge accumulation start signal and a charge accumulation end signal fed from the timing control circuit 124, exposure (charge accumulation by the action of photoelectric conversion) to the subject image imaged on a photo-detecting plane, causing an image signal related to the exposed subject image to be generated. The image sensor 5 also outputs, in response to a readout control signal fed from the timing control circuit 124, the above exposed subject image-related image signal to a signal processing unit 51. A timing signal (a synchronous signal) from the timing control circuit 124 is fed to the signal processing unit 51, as well as to an A/D (analog/digital) converting circuit 52.

The image signal acquired by the image sensor 5 is given predetermined analog signal processing with the signal processing unit 51. The image signal having undergone the above analog signal processing is converted by the A/D converting circuit 52 into digital image data (image data), which is then fed to the digital signal processing circuit 50.

The digital signal processing circuit 50 gives digital signal processing to the image data fed from the A/D converting circuit 52, causing the image data related to the taken image to be generated. The digital signal processing circuit 50 has a black level correcting circuit 53, a white balance (WB) circuit 54, a γ correcting circuit 55 and an image memory 56.

The black level correcting circuit 53 is to correct a black level of each pixel data included in the image data outputted from the A/D converting circuit 52 to a reference black level. The WB circuit 54 is to make adjustment of image white balance. The γ correcting circuit 55 is to perform taken-image tone conversion. The image memory 56 is of high-speed accessible type used to temporarily store the generated image data, and has a capacity enough to permit storage of image data corresponding to more than one frame.

During actual shooting, the image data temporarily stored in the image memory 56 is given appropriate image processing (such as compression) with the general control unit 101, followed by being stored in the memory card 90 through a card I/F 132.

The image data temporarily stored in the image memory 56 is also properly transferred to a VRAM 131 by the general control unit 101, causing the image based on the image data to be displayed on the rear monitor 12. This provides display such as confirmative display, or after viewing, useful in checking the taken image and playback display adapted to play back the already taken image.

The imaging apparatus 1 further has an image sensor 7 (See FIG. 4) different from the image sensor 5. The image sensor 7 functions as an image sensor for acquiring a so-called live view image, or for acquiring the moving image. The image sensor 7 also has the same configuration as the image sensor 5. However, the image sensor 7 has only to hold a resolution sufficient for generating image signals or moving images for live viewing, and is thus normally configured with a smaller number of pixels as compared to the image sensor 5.

The same signal processing as that with respect to the image signal acquired by the image sensor 5 is also given to the image signal acquired by the image sensor 7. Specifically, the image signal acquired by the image sensor 7 is given the predetermined processing with the signal processing unit 51, and is then converted by the A/D converting circuit 52 into digital data, which is then given the predetermined image processing with the digital signal processing unit 50, followed by being stored in the image memory 56.

The time-series image data stored in the image memory 56 after being acquired by the image sensor 7 is also properly transferred to the VRAM 131 by the general control unit 101 in sequence, causing the image based on the transferred time-series image data to be displayed on the rear monitor 12. This provides moving-image-mannered display (live viewing) adaptable to effect the framing.

The imaging apparatus 1 further has a communications I/F 133, and may establish data communications with an apparatus (such as personal computers, for instance) specified as the destination of connection with the interface 133.

The imaging apparatus 1 further has a flash 41, a flash control circuit 42 and an AF auxiliary-light emitting unit 43. The flash 41 is a light source applicable to cases where there is a lack of luminance of the subject. Requirements such as the need or not of flash lighting and the flash lighting duration are controlled by the flash control circuit 42 and the general control unit 101 etc. The AF auxiliary-light emitting unit 43 is an auxiliary light source for AF purpose. Requirements such as the need or not of lighting and the lighting duration of the AF auxiliary-light emitting unit 43 are controlled by the general control unit 101 etc.

<1-3. Shooting Operation>

<Outline>

The shooting operation including the framing with respect to the imaging apparatus 1 is now described. As previously described, the imaging apparatus 1 may provide not only the framing using the optical viewfinder (also called OVF) configured with a viewfinder optical system etc., but also the framing using the live view image displayed on the rear monitor 12 (described later). It is noted that a viewfinder function implemented by use of the image sensor 7 and the rear monitor 12 is to visualize the subject light image after conversion of the subject light image into electronic data, and is thus also called an electronic viewfinder (EVF).

As described later, the operator may select, by operating the switching dial 87, between the framing with the optical viewfinder (OVF) and the framing with the electronic viewfinder (EVF).

Figure 4:
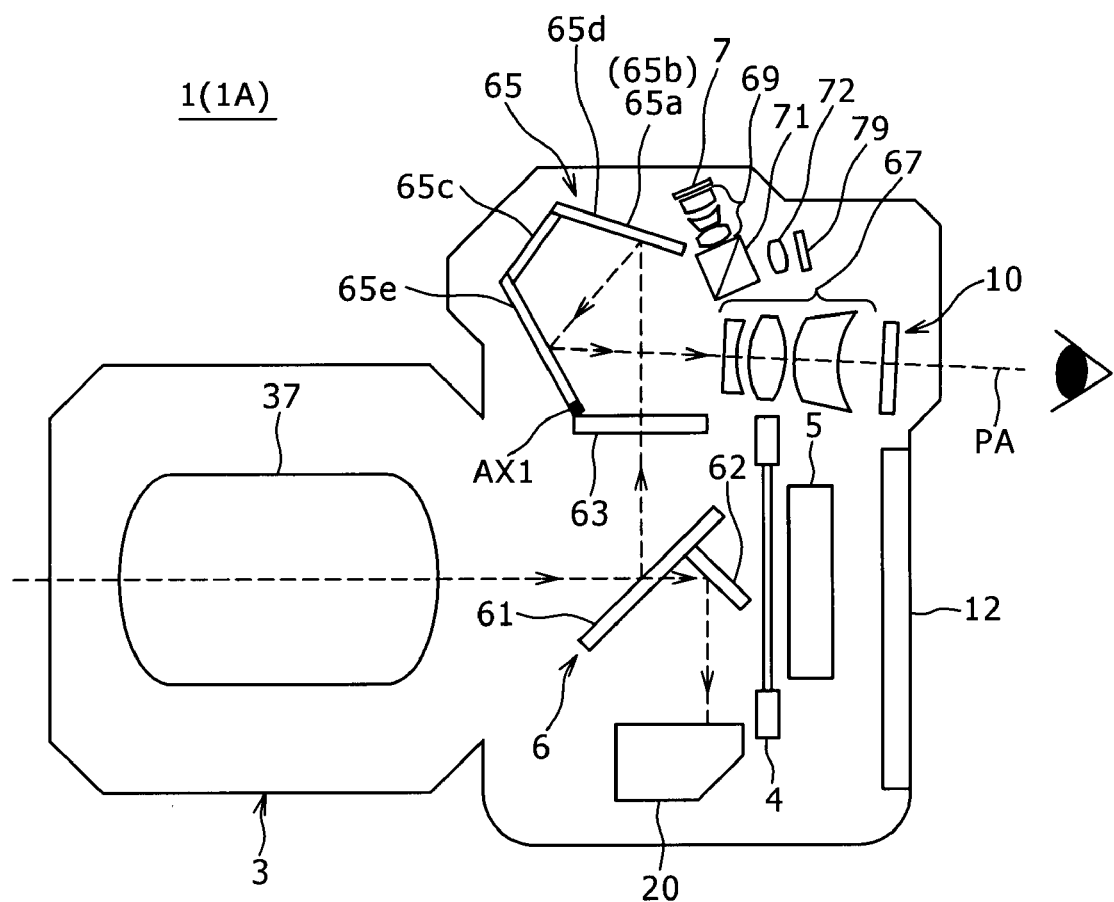
FIG. 4 is a sectional view showing a framing operation with an optical viewfinder (OVF)
Figure 5:
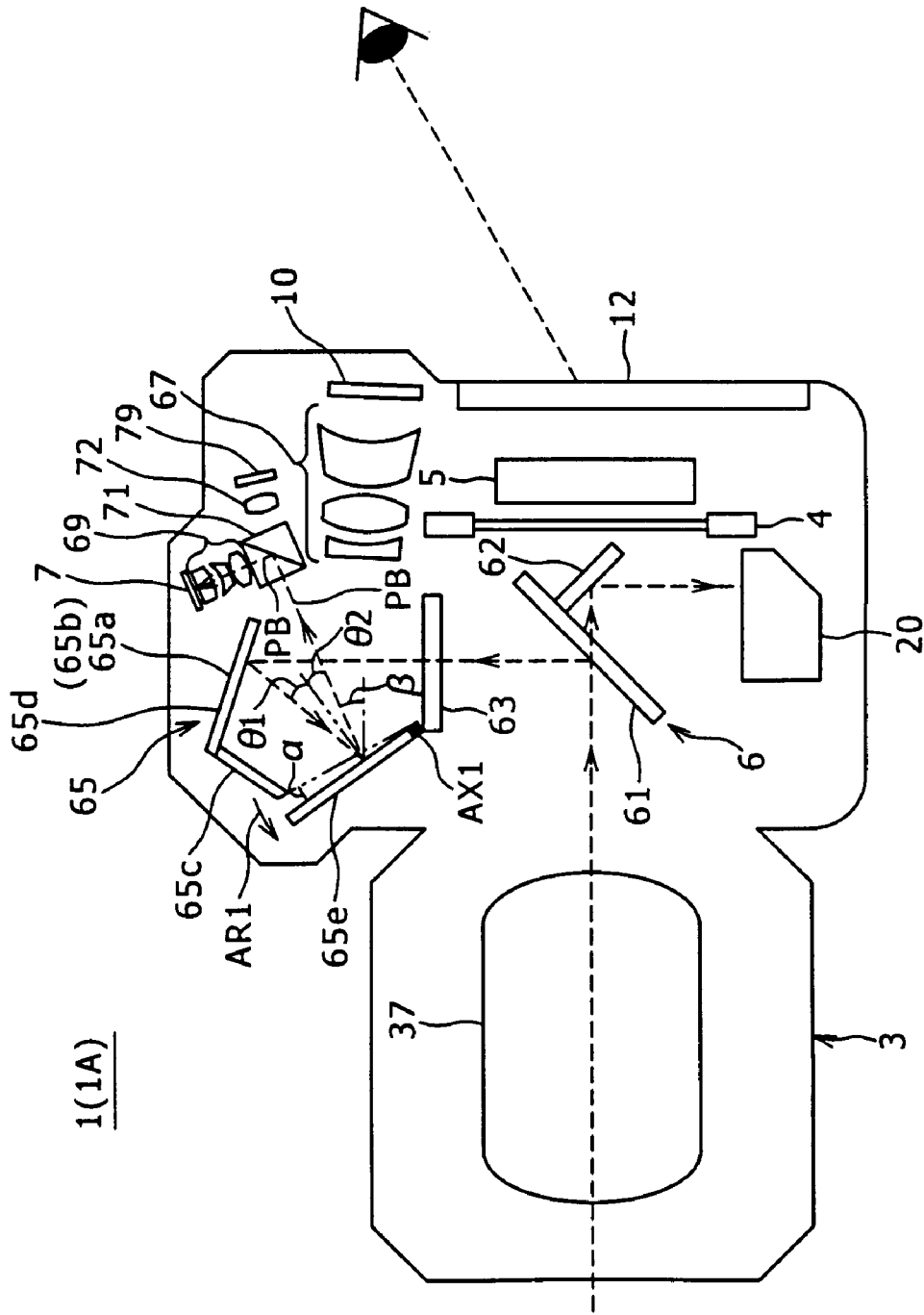
FIG. 5 is a sectional view showing a framing operation with an electronic viewfinder (EVF)
Figure 6:
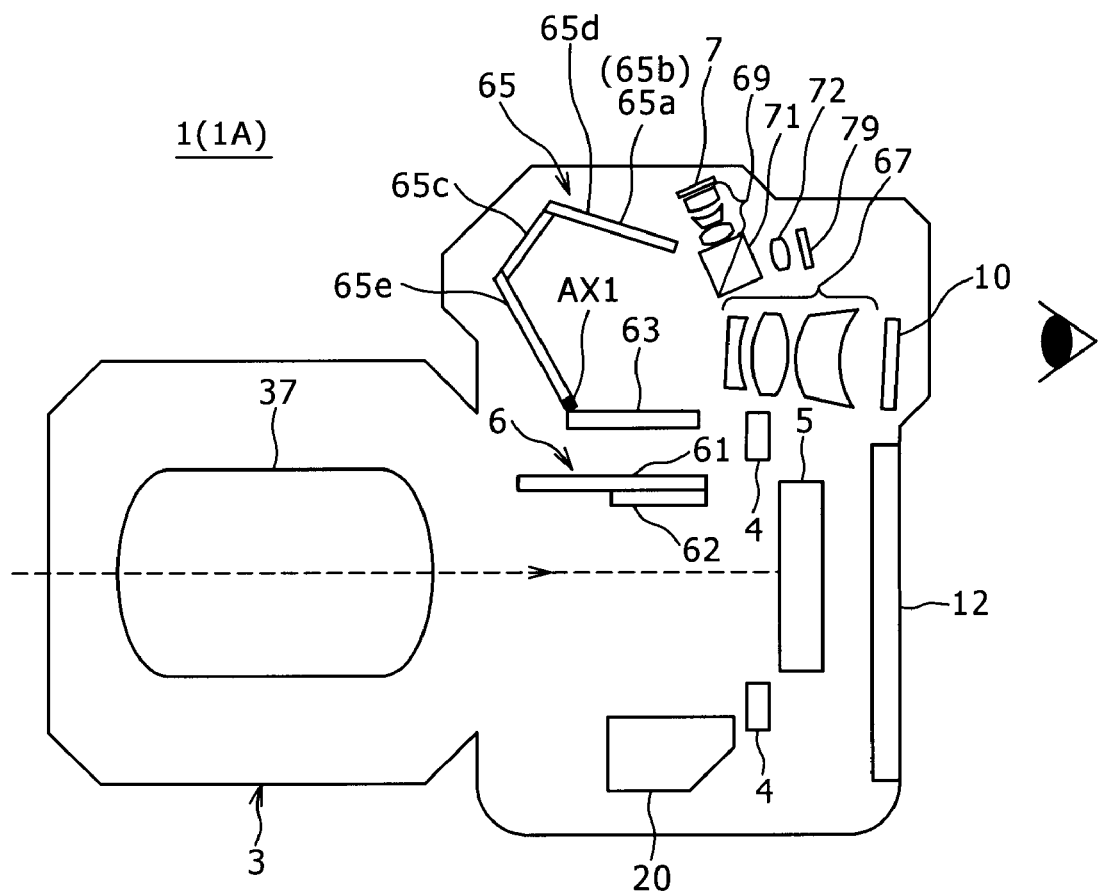
FIG. 6 is a sectional view showing an operation during exposing.

FIGS. 4 and 5 are sectional views showing the imaging apparatus 1. FIG. 4 shows the framing operation involving use of the OVF, and FIG. 5 shows the framing operation involving use of the EVF. FIG. 6 is a sectional view showing an operating state during the exposing.

As shown in figures such as FIG. 4, the mirror mechanism 6 is provided on an optical path (a shooting optical path) extending from the imaging lens unit 3 to the image sensor 5. The mirror mechanism 6 has a main mirror 61 (a main reflective surface) that reflects light received from the optical imaging system upwards. The main mirror 61 is configured partially or wholly as a half mirror, for instance, permitting transmission of part of the light received from the image taking optical system. The mirror mechanism 6 also has a sub mirror 62 (a sub reflective surface) that causes the light having transmitted through the main mirror 61 to be reflected downwards. The light having been reflected downwards from the sub mirror 62 is so guided as to be incident on the AF module 20, permitting contributions toward use for the AF operation based on the phase difference scheme.

Before the release button 11 goes into the full-pressed state S2 in the shooting mode, in other words, during the framing, the mirror mechanism 6 is so placed as to obtain the mirror-down state (See FIGS. 4 and 5). Then, during the framing, the subject image received from the imaging lens unit 3 is so reflected upwards from the main mirror 61 as to be incident on a pentagonal mirror 65 as a monitoring luminous flux. The term "monitoring luminous flux" in the specification means a luminous flux for viewing. The pentagonal mirror 65 has more than one mirror or reflective surfaces, and provides a subject-image direction adjustment function. A course of the monitoring luminous flux after incidence on the pentagonal mirror 65 varies depending on which of the above two types of systems (or the OVF and the EVF) is adopted to carry out the framing. The details of the above are described later. The operator may give effect to the framing according to a desired scheme selected.

By the way, when the release button 11 is placed in the full-pressed state S2, the mirror mechanism 6 is so driven as to obtain the mirror-up state, leading to the start of the exposing operation (See FIG. 6). The operation (or that during the exposing) for acquiring the subject-related still image for recording (also referred to as the taken image under consideration) is supposed to be common to the framing with the above two types of systems, the OVF and the EVF.

Specifically, as shown in FIG. 6, during the exposing, the mirror mechanism 6 is in the position of refuge from the shooting optical path. More specifically, the main mirror 61 and the sub mirror 62 take refuge upwards not to intercept the light (the subject image) received from the image taking optical system, causing the light from the imaging lens unit 3 to reach the image sensor 5 according to a timing to open the shutter 4. The image sensor 5 generates the subject image signal based on the detected luminous flux by the action of photoelectric conversion. In this manner, the light received from the subject is guided to the image sensor 5 through the imaging lens unit 3, permitting the subject-related taken image, i.e., taken image data, to be obtained.

<Framing Operation with the Optical Viewfinder>

Operations with the above two types of systems at the time of the framing are now described respectively.

To begin with, the framing operation with the OVF system is described.

As shown in FIG. 4, when the main mirror 61 and the sub mirror 62 of the mirror mechanism 6 are placed on the optical path of the subject image received from the imaging lens unit 3, the subject image is guided toward the viewfinder window 10 through the main mirror 61, the pentagonal mirror 65 and an eyepiece 67. As described the above, the viewfinder optical system including the main mirror 61, the pentagonal mirror 65 and the eyepiece 67 is adaptable to guide, toward the viewfinder window 10, the monitoring luminous flux, which is included in the luminous flux received from the optical imaging system, specifically, the luminous flux having been reflected from the main mirror 61.

More specifically, the light received from the imaging lens unit 3 is reflected from the main mirror 61 to change the course upwards so that the reflected light passes through a focusing screen 63 after being imaged on the focusing screen 63. Afterwards, the light image having passed through the focusing screen 63 undergoes a further change in the course with the pentagonal mirror 65, followed by traveling toward the viewfinder window 10 through the eyepiece 67 (See an optical path PA in FIG. 4). In this manner, the subject image having passed through the viewfinder window 10 reaches the photographer's eye, or a viewer's eye, for visual confirmation. In other words, the photographer may check the subject image by looking in at the viewfinder window 10.

In the present invention, the pentagonal mirror 65 has two mirror planes (dach mirror) 65a and 65b forming a delta roof (See FIG. 7 as well), a plane 65c fixed to the dach mirrors (dach planes) 65a and 65b, and another mirror (a reflective surface) 65e. The delta roof-shaped two mirror planes 65a and 65b are provided in the form of an integral component 65d by plastic molding. The light whose course has been changed upwards through reflection from the main mirror 61 is reflected from the dach mirrors 65a and 65b into an mirror-reversed image, followed by traveling to the mirror 65e, where the above mirror-reversed image is further reflected into an upside-down image, which is supposed to reach the photographer's eye. Thus, the light image having been mirror-reversed and turned upside down with the imaging lens unit 3 is further mirror-reversed and turned upside down with the pentagonal mirror 65. This enables the photographer to view, through the optical viewfinder, the subject image whose top and bottom, as well as whose left and right, are in the same state as the actual subject.

Further, the light transmitted through the main mirror 61 is reflected from the sub mirror 62 to change the course downwards so that the reflected light enters the AF module 20. The units such as the AF module 20 and the focus control unit 121 are adapted to provide the AF operation using the light having reached through the main mirror 61 and the sub mirror 62.

<Framing Operation with the Electronic Viewfinder>

The framing operation with the EVF system is now described.

For this framing operation, as shown in FIG. 5, the main mirror 61 and the sub mirror 62 of the mirror mechanism 6 are also placed on the optical path of the subject image received from the imaging lens unit 3. Then, the light received from the imaging lens unit 3 is reflected from the main mirror 61 to change the course upwards so that the reflected light passes through the focusing screen 63 after being imaged on the focusing screen 63.

However, with respect to the framing operation with the EVF system, the light having passed through the focusing screen 63 undergoes, after the further change in the course with the pentagonal mirror 65, a still further change in the course with a beam splitter 71 so that the resultant light is re-imaged (See an optical path PB in FIG. 5) on the imaging plane of the image sensor 7 after passing through an imaging lens 69 (an imaging optical system). It is noted that the light whose course has been changed upwards through reflection from the main mirror 61 is reflected from the dach mirrors 65a and 65b into a mirror-reversed image, followed by traveling to the mirror 65e, where the above mirror-reversed image is further reflected into an upside-down image, which is further mirror-reversed and turned upside down with the imaging lens 69, and afterwards, reaches the image sensor 7.

More specifically, as seen by a comparison with FIG. 4, FIG. 5 shows a state where change is made in an angle (an installation angle with respect to the camera body unit 2) of the mirror 65e. That is, the mirror 65e swings from a position shown in FIG. 4 about its lower end-side axis AX1 in a direction shown by an arrow AR1 by a predetermined angle α. It is noted that as described later, the mirror 65e makes a turning motion depending on the operation given by the photographer.

Then, the change in the angle of the mirror 65e creates a change in reflection angle of the light, that is, the monitoring luminous flux, reflected from the mirror 65e, resulting in a change in a travel route of the reflected light caused by the mirror 65e. Specifically, as compared with the state shown in FIG. 4, an angle θ1 of incidence on the mirror 65e is relatively made smaller, and a reflection angle θ2 is also made smaller. As a result, the light reflected from the mirror 65e undergoes the change in the course upwards, specifically, from the optical path leading to the eyepiece 67 to the optical path close to the dach mirrors 65a and 65b, followed by traveling to the beam splitter 71, where the reflected light further undergoes the change in the course, and afterwards, reaches the image sensor 7 through the imaging lens 69. It is noted that the beam splitter 71, the imaging lens 69 and the image sensor 7 are located above the eyepiece 67 or at positions where no interception of the luminous flux traveling from the mirror 65e to the eyepiece 67 is caused during the framing with the OVF.

The course of the luminous flux having been reflected from the mirror 65e is changed, depending on the turning angle α of the mirror 65e, by an angle β(=2×α) which is twice as large as the angle α. Conversely speaking, the angle α as small as the half of the angle β is supposed to be sufficient for the turning angle of the mirror 65e in order to change a travel angle of the reflection optical path to the angle β. In other words, a relatively small turning angle of the mirror 65e provides a relatively large change in the course of the light reflected from the mirror 65e. In addition, the mirror 65e and the image sensor 7 are optically spaced relatively apart from each other. Thus, only a slight change in the turning angle of the mirror 65e permits two reflected lights caused by the mirror 65e to be surely guided to the eyepiece 67 and the image sensor 7 which are spaced apart from each other. In other words, the slight change in the turning angle of the mirror 65e is adaptable to provide selective traveling of the luminous flux of the reflected light caused by the mirror 65e along the two optical paths satisfactorily. Accordingly, a space increase caused by turning of the mirror 65e may be minimized.

The image sensor 7 generates a live view image based on the subject image reaching the image sensor 7 through the imaging lens 69 after having been reflected from the mirror 65e. Specifically, more than one image is generated in sequence at minute time intervals (1/60 sec., for instance). Then, the acquired time-series image is displayed in sequence on the rear monitor 12. This enables the photographer to perform, after visually confirming the moving image, that is, the live view image, displayed on the rear monitor 12, the framing using the displayed moving image.

In this case, the AF operation is also realized using the light having entered the AF module 20 through the main mirror 61 and the sub mirror 62, like the framing with the OVF (See FIG. 4).

As described the above, the change in the reflection angle of the mirror 65e causes the course, more specifically, a main course, of the monitoring luminous flux after having been reflected from the mirror 65e to be switched between the optical path PA (See FIG. 4) extending from the mirror 65e to the eyepiece 67 and the viewfinder window 10 and the optical path PB (See FIG. 5) extending from the mirror 65e to the imaging lens 69 and the image sensor 7. In other words, the change in the reflection angle of the mirror 65e causes the course of the monitoring luminous flux to be switched between the first optical path PA reflected from the mirror 65e toward the viewfinder window 10 and the second optical path PB reflected from the mirror 65e toward the image sensor 7.

Thus, unlike the related art, the imaging apparatus 1 may bring the live viewing to realization without providing, within the optical path in the vicinity of the eyepiece 67 of the viewfinder optical system, a movable reflection mirror movable to and away from the optical path of the subject image. In other words, the imaging apparatus 1 ensures that the live viewing is attainable with a compact configuration.

The imaging apparatus 1 also provides visual confirmation of the subject image in a bright condition through the optical viewfinder in such a manner as to avoid or suppress a decrease in an amount of light reaching the optical viewfinder, as compared with the case like the above related art where the large decrease in the amount of light reaching the viewfinder window is caused by splitting of the monitoring luminous flux into one component traveling toward the image sensor for live viewing and the other component traveling toward the viewfinder window using the beam splitter or the half mirror.

In the imaging apparatus 1, the change is made in the reflection angle of a certain reflective surface, specifically, the mirror 65e, among the mirrors 65a, 65b and 65e included in the pentagonal mirror 65, whereas the other reflective surfaces, that is, the roof mirrors 65a and 65b, are fixed. Specifically, the change in the course of the monitoring luminous flux is caused by driving of only one reflective surface 65e among the reflective surfaces, enabling a reduction in drive portion to be attained to ensure that the compact configuration is obtainable.

In the imaging apparatus 1, the change in the course of the luminous flux is made by changing the reflection angle of the mirror 65e specified as the reflective surface other than the dach mirrors 65a and 65b, among the reflective surfaces included in the pentagonal mirror 65 of the viewfinder optical system, enabling the change in the course of the monitoring luminous flux to be achieved more easily as compared with the case where the dach mirrors 65a and 65b are driven.

<Mechanism of Switching Between two Framing Operations>

Switching between the framing operation with the OVF and the framing operation with the EVF is now described.

Figure 7:
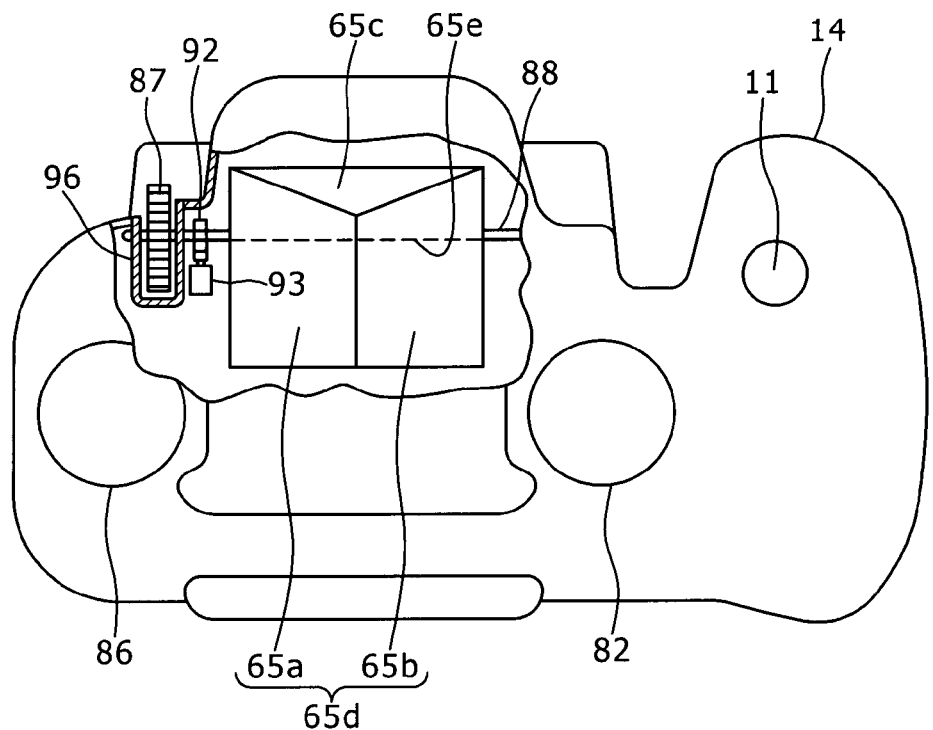
FIG. 7 is a top view of the imaging apparatus.
Figure 8:
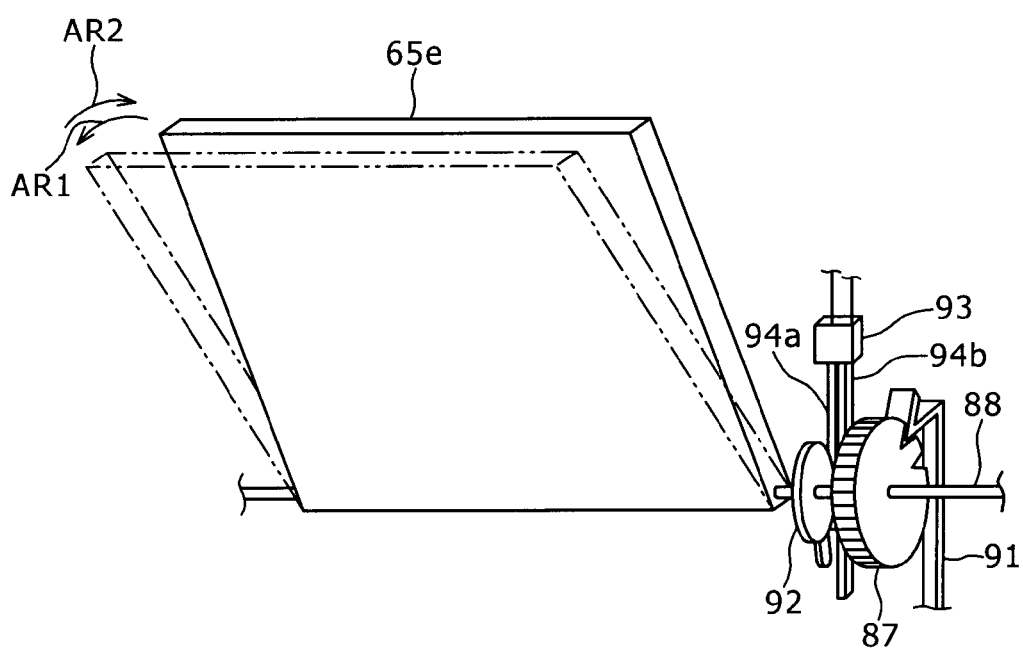
FIG. 8 is a schematic view showing an angle-changeable mirror drive mechanism.

FIG. 7 is a top view of the imaging apparatus 1, and FIG. 8 is a schematic view showing a drive mechanism, in other words, an angle changing mechanism, of the mirror 65e. It is noted that with respect to FIG. 7, there is shown an internal configuration with its part broken away.

As shown in FIG. 8, the rectangular mirror 65e is so provided as to permit turning about an axis approximately parallel to a longitudinal direction of the mirror. Specifically, the rectangular mirror 65e has, on its lower end, an axial member 88 which is fixed to the mirror 65e through an insertion hole provided along a lower side of the mirror 65e. The axial member 88 is axially supported with the opposite ends of the mirror 65e to ensure that turning or swinging of the mirror 65e is allowed.

A switching dial 87 and a rotor 92 are fixed to the axial member 88.

As shown in FIG. 7, the switching dial 87 has a portion projecting from an outer surface of the camera body unit 2 of the imaging apparatus 1. Thus, the photographer may perform turning of the switching dial 87 by use of the projecting portion of the switching dial 87. It is noted that the switching dial 87 is surrounded with a partition 96 to prevent foreign matters such as dust from entering the apparatus through the portion of the switching dial 87.

Figure 9:
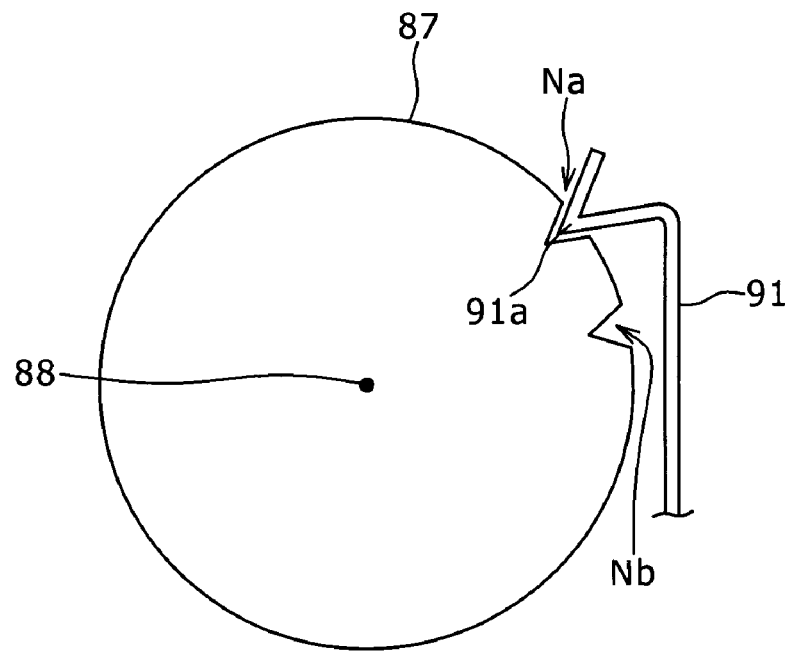
FIG. 9 is a view showing a configuration around a switching dial.

FIG. 9 is a schematic view showing a configuration around the switching dial 87. As shown in FIG. 9, the switching dial 87 has, on its outer circumference, two notches Na and Nb. An elastic member 91 is also provided on the outer circumference of the switching dial 87. The elastic member 91 has, at its tip end, a projection 91a which is pressed onto the outer circumference of the switching dial 87 with adequate elastic force applied, permitting relative movement along the outer circumference in association with turning motion of the switching dial 87. The projection 91a of the elastic member 91 is adaptable to fix the position of the switching dial 87 in the turning direction by selectively making engagement with one of the two notches Na and Nb. While the projection 91a of the elastic member 91 is in engagement with the notch Na, the framing operation with the OVF is performed. Conversely, while the projection 91a of the elastic member 91 is in engagement with the notch Nb, the framing operation with the EVF is performed.

The photographer may bring the framing operation with the EVF into effect by operating the switching dial 87 to turn the mirror 65e in the direction shown by the arrow AR1 into engagement of the projection 91a of the elastic member 91 with the notch Nb. Conversely, the framing operation with the OVF may be brought into effect by operating the switching dial 87 to turn the mirror 65e in the direction shown by an arrow AR2 into engagement of the projection 91a of the elastic member 91 with the notch Na.

Figure 10:
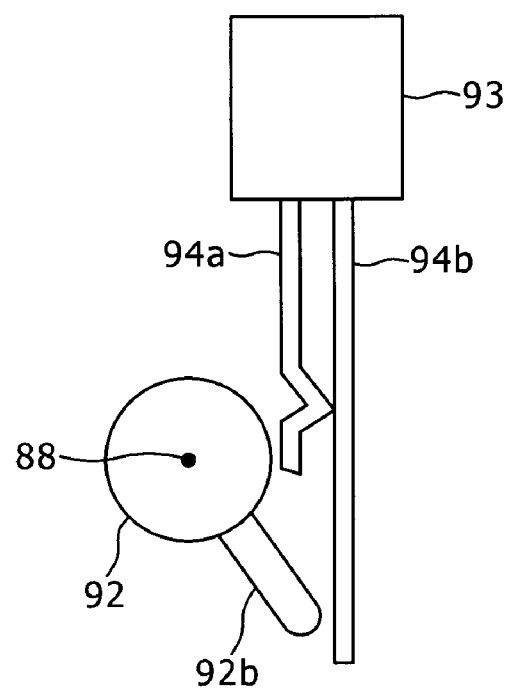
FIG. 10 is a view showing a detection state with respect to the framing operation with the OVF.
Figure 11:
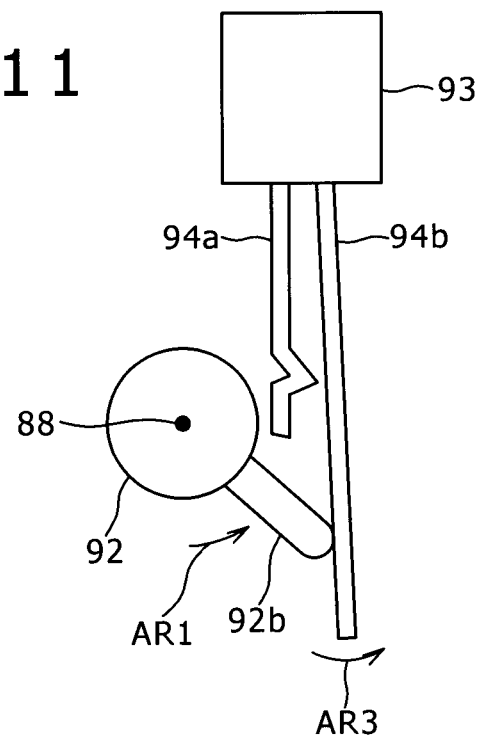
FIG. 11 is a view showing a detection state with respect to the framing operation with the EVF.

There are provided the rotor 92 and a detector 93 in order to detect the angle of the mirror 65e. As shown in FIG. 10, during the framing operation with the OVF, two electric connectors 94a and 94b of the detector 93 are in contact with each other to provide an on state. Conversely, as shown in FIG. 11, during the framing operation with the EVF, force in a direction shown by an arrow AR3 is applied to the electric connector 94b by a projection 92b of the rotor 92 in association with the turning motion of the axial member 88, causing the electric connector 94b to be deformed rightwards in FIG. 11. As a result, the electric connector 94b is separated from the electric connector 94a, causing the electric connectors 94a and 94b to be turned to an off state. The detector 93 is to perform detection of the angle of the mirror 65e by detecting the above two states (on and off).

The general control unit 101 is to determine, based on the detected state obtained by the detector 93, which of the framing operation with the OVF and the framing operation with the EVF is to be performed. Specifically, when the detected state by the detector 93 is the on state, the general control unit determines that the framing operation with the OVF is to be performed, followed by performing processing such as blanking out the rear monitor 12 by stopping feeding to the image sensor 7. Conversely, when the detected state by the detector 93 is the off state, the general control unit determines that the framing operation with the EVF is to be performed, followed by performing processing such as displaying the live view image on the rear monitor 12, together with feeding to the image sensor 7.

<Photometric Processing>

Photometric processing at the time of the framing operation with the EVF is now described, together with photometric processing at the time of the framing operation with the OVF.

Figure 12:
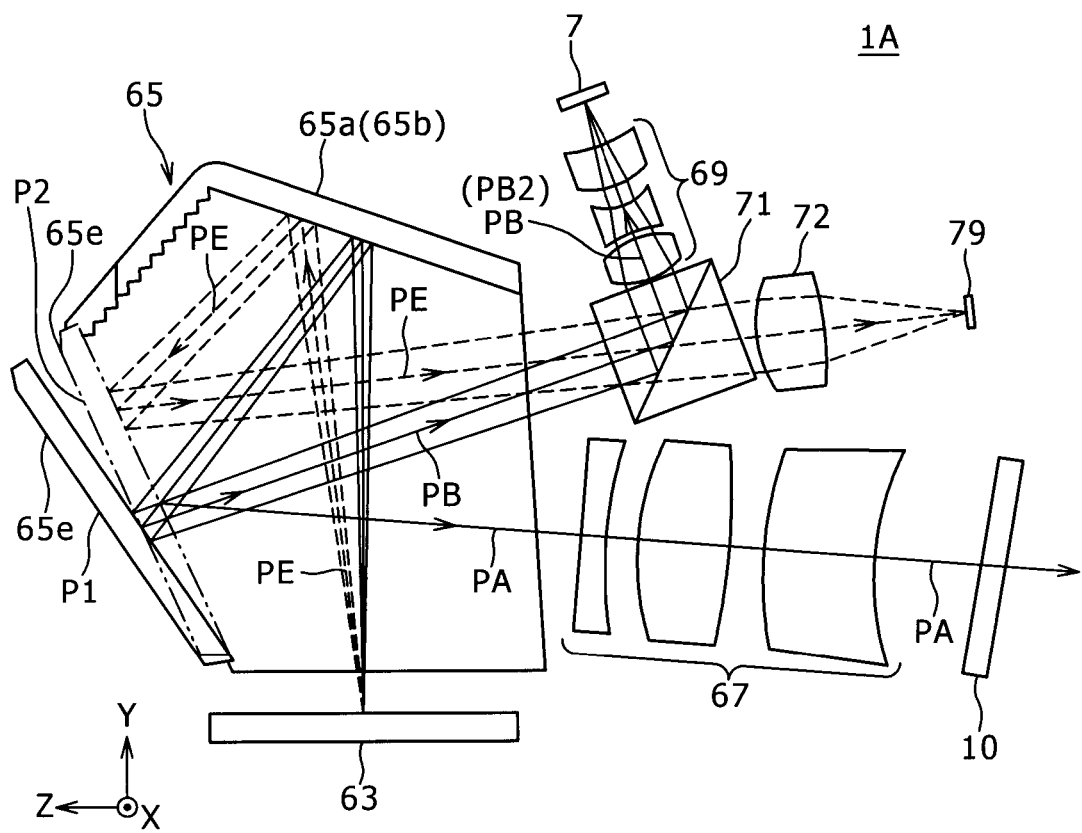
FIG. 12 is a sectional view showing an internal configuration of the imaging apparatus according to the first embodiment.

FIG. 12 is an enlarged sectional view showing an internal configuration around the pentagonal mirror 65. As shown in FIG. 12, the eyepiece 67 and the viewfinder window 10 are provided on the optical path PA. On the other hand, the beam splitter 71, the imaging lens 69 and the image sensor 7 are provided on the optical path PB.

The beam splitter 71 provides an optical path changing function to change the travel direction of the light, in other words, the course of the light or the optical path. Specifically, the beam splitter 71 is placed on the optical path PB to change, upwards by approximately 90-degrees, the course of the light, more specifically, the light having been reflected from the reflective surface 65e, having traveled along the optical path PB. On the optical path PB (or PB2) resulting from the change in the travel direction with the beam splitter 71, the imaging lens 69 and the image sensor 7 are placed. Thus, the luminous flux whose travel direction has been changed with the beam splitter 71 is supposed to be imaged on the image sensor 7 through the imaging lens 69.

During the framing operation with the EVF, the reflective surface 65e is located at a position P1, causing the course of the monitoring luminous flux to be switched to the optical path PB. At this time, an image-to-be-taken is generated based on the subject image imaged on the image sensor 7 through the beam splitter 71 and the imaging lens 69 after having traveled along the optical path PB. Then, the live viewing goes into effect using the thus-generated image-to-be-taken, and at the same time, the photometric processing is also performed using the same image-to-be-taken. For instance, the photometric processing performed is to calculate, by dividing the image-to-be-taken obtained by the image sensor 7 into more than one photometric block (8 (width)×10 (length)=40 (blocks), for instance), an amount of light detected with respect to each photometric block. Further, an automatic exposure control, i.e., a processing to determine shooting parameters, such as aperture value and shutter speed, adaptable to provide adequate brightness takes place based on the result of the photometric processing.

On the other hand, during the framing operation with the OVF, the reflective surface 65e is located at a position P2 (shown by a broken line in FIG. 12), causing the course of the monitoring luminous flux to be switched to the optical path PA. At this time, the visual confirmation of the subject image is provided through the viewfinder window 10, and at the same time, the photometric processing is performed using a photometric sensor 79 placed in the vicinity of the optical path PA. The photometric sensor 79 is to perform the photometric processing in such a manner as to detect, through an imaging lens 72, the luminous flux transmitted through the beam splitter 71 placed in the vicinity of the optical path PA.

The photometric sensor 79 is placed in consideration of the focusing screen 63, permitting detection of the light having traveled following an optical path PE shown by a dotted line in FIG. 12, more specifically, the light transmitted through the beam splitter 71 after having traveled in the vicinity of the optical path PA. Hereupon, the beam splitter 71 is in a position that falls on the optical path PB and is also assumed to be on the optical path PE, in which case, however, the luminous flux traveling along the optical path PE is supposed to reach the photometric sensor 79 through the beam splitter 71. The photometric sensor 79 performs, by detecting the luminous flux traveling along the optical path PE, detection of the same subject image, in other words, the same light image as the subject image specified as a target for shooting, as the subject image of the monitoring luminous flux traveling along the optical path PA, more specifically, the light image that the subject related to the subject image detected through the viewfinder window 10 is viewed from a slightly different angle, or from a somewhat oblique direction.

Then, the photometric processing is properly provided based on the amount of light detected in the photometric sensor 79. For instance, the photometric processing to calculate the amount of light detected with respect to each of more than one photometric unit (8×5=40, for instance) within the photometric sensor 79 is performed. In addition, the automatic exposure control, i.e., the processing to determine the shooting parameters, such as the aperture value and the shutter speed, adapted to provide the adequate brightness takes place based on the result of the above photometric processing.

It is noted that during the framing operation with the OVF, the course of the monitoring luminous flux is switched to the optical path PA, so that no imaging of any appropriate subject image is given to the image sensor 7. Thus, no installation of the photometric sensor 79 of the above type results in a difficulty in providing the appropriate photometric processing during the framing operation with the OVF.

Figure 13:
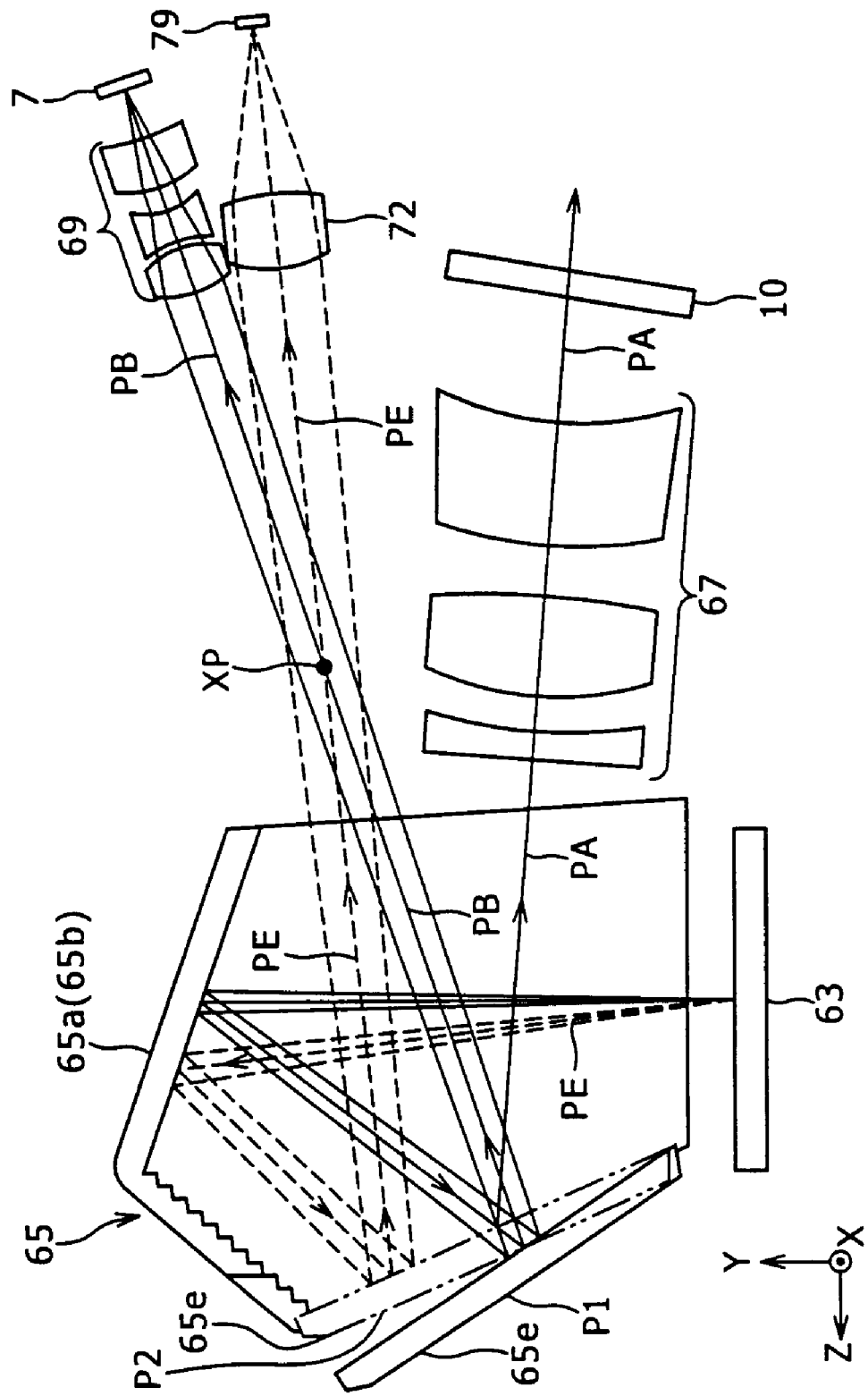
FIG. 13 is a sectional view showing an internal configuration of an imaging apparatus according to one embodiment for comparison.

FIG. 13 is a view showing one embodiment for comparison. Referring to FIG. 13, there is shown a case where the photometric processing is achieved using the image sensor 7 and the photometric sensor 79 without providing the beam splitter 71. In other words, this embodiment for comparison in FIG. 13 is different from the above first embodiment in that the former is not provided with the beam splitter 71.

As shown in FIG. 13, the optical path PB and the optical path PE cross at a position XP in the vicinity of an exit of the pentagonal mirror 65, or in the vicinity of an upper part of the eyepiece 67. In this case, a need exists to avoid interference between the imaging lens 69 placed on the optical path PB and the imaging lens 72 placed on the optical path PE. For that purpose, in an arrangement in FIG. 13, the imaging lens 69 and the imaging lens 72 are placed at a distance from the crossing position XP, specifically, in positions backed toward the rear, or the right in FIG. 13, with respect to each optical path. This arrangement is also called a backed placement. As shown in FIG. 13, application of the arrangement of this type results in a need for an extra space at the rear side of the camera to provide the imaging lenses 69 and 72 etc. in the backed placement. The space for the backed placement like the above undesirably leads to an increase in imaging apparatus size.

On the other hand, the above first embodiment (See FIG. 12) attempts to change the course of the optical path PB by providing the beam splitter 71, so that the need for the above backed placement to avoid the interference is eliminated, resulting in a higher degree of freedom in placement. Specifically, the above first embodiment attempts to realize the miniaturization while avoiding the interference between the imaging lenses 69 and 72 by providing the imaging lens 69 and the image sensor 7 on the optical path PB2 resulting from the change in the travel direction, while providing the imaging lens 72 and the photometric sensor 79 close to the beam splitter 71.

2. Second Embodiment

Figure 14:
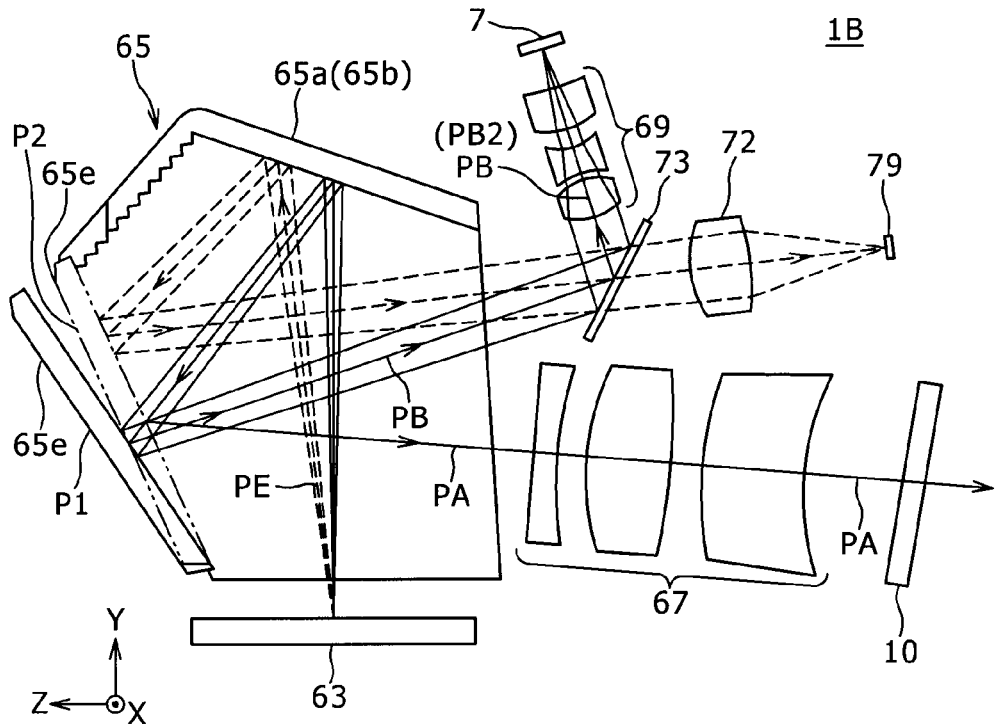
FIG. 14 is a sectional view showing an internal configuration of an imaging apparatus according to a second embodiment.

A second embodiment relates to a modification of the first embodiment. The following is described with emphasis put on a difference from the first embodiment. FIG. 14 is an enlarged sectional view showing an internal configuration around the pentagonal mirror 65 of an imaging apparatus 1B according to the second embodiment.

As shown in FIG. 14, the imaging apparatus 1B is different from the imaging apparatus 1A in that the former has a half mirror 73 in place of the beam splitter 71.

The half mirror 73 also provides the same functions as those of the beam splitter 71. For instance, the function of changing the travel direction of the light traveling along the optical path PB during the framing with the EVF and the function of permitting transmission of the light traveling along the optical path PE during the framing with the OVF are included.

The configuration of this type enables the same effects as those of the first embodiment to be obtained as well.

3. Third Embodiment

Figure 15:
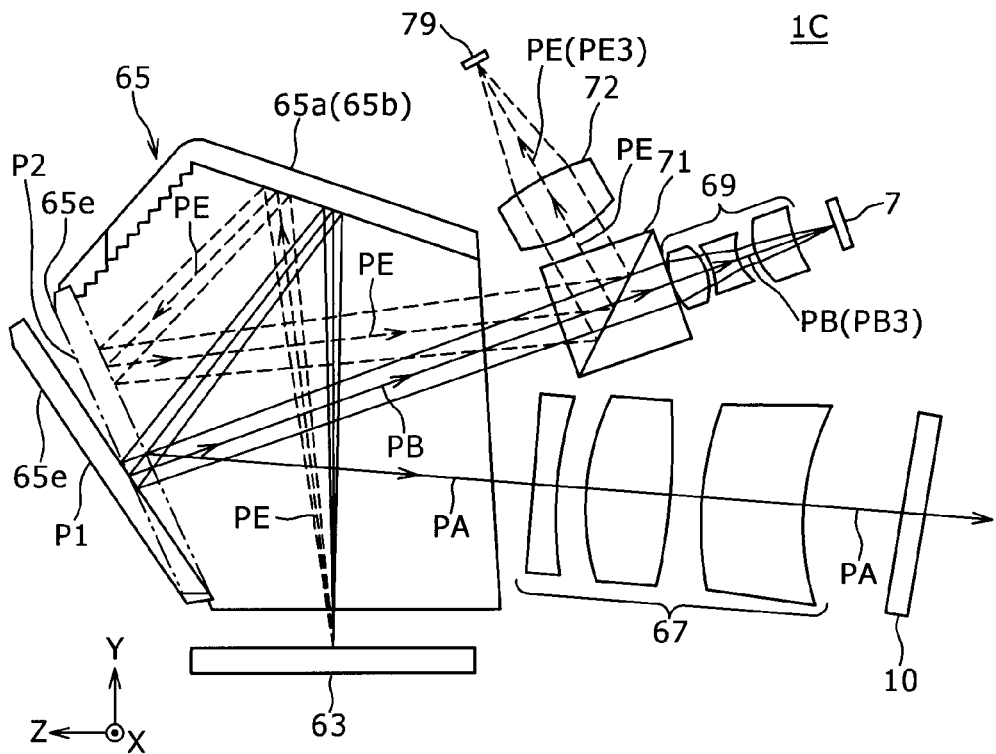
FIG. 15 is a sectional view showing an internal configuration of an imaging apparatus according to a third embodiment.

A third embodiment relates to a different modification of the first embodiment. The following is described with emphasis put on a difference from the first embodiment. FIG. 15 is an enlarged sectional view showing an internal configuration around the pentagonal mirror 65 of an imaging apparatus 1C according to the third embodiment.

As shown in FIG. 15, to come to the point, the imaging apparatus 1C takes a configuration that seems to approximately reverse a positional relation between the image sensor 7 and the photometric sensor 79 with respect to the imaging apparatus 1A.

Specifically, the imaging lens 69 and the image sensor 7 are provided on the optical path PB, more specifically, an optical path (a transmitting optical path) PB3 resulting from transmission through the beam splitter 71. The imaging lens 72 and the photometric sensor 79 are provided on the optical path PE, more specifically, an optical path PE3 resulting from the change in the travel direction with the beam splitter 71. It is noted that the eyepiece 67 and the viewfinder window 10 are provided on the optical path PA, like the first embodiment.

During the framing operation with the EVF, the reflective surface 65e is located at a position P1, causing the course of the monitoring luminous flux to be switched to the optical path PB. At this time, the image-to-be-taken is generated based on the subject image imaged on the image sensor 7 after having traveled along the optical path PB. Then, the live viewing goes into effect using the thus-generated image-to-be-taken, and at the same time, the photometric processing is also performed using the same taken image. When the course of the monitoring luminous flux takes the optical path PB, the image sensor 7 is supposed to perform the photometric processing by detecting the luminous flux transmitted through the beam splitter 71 placed on the optical path PB.

On the other hand, during the framing with the OVF, the reflective surface 65e is located at a position P2 (shown by the broken line in FIG. 12). At this time, the course of the monitoring luminous flux is switched to the optical path PA, causing the visual confirmation of the subject image to be provided through the viewfinder window 10, and at the same time, causing the photometric processing to be performed using the photometric sensor 79 placed on the optical path PE, or PE3, resulting from the change in the travel direction with the beam splitter 71 with respect to the luminous flux traveling along the optical path PE in the vicinity of the optical path PA. The beam splitter 71 is placed in the vicinity of the optical path PA, causing the travel direction of the luminous flux traveling along the optical path PE, specifically, the optical path traveling from the exit side of the pentagonal mirror 65 toward the beam splitter 71, in the vicinity of the optical path PA to be changed upwards. The photometric sensor 79 is provided on the optical path PE3 resulting from the change in the travel direction with the beam splitter 71. The photometric sensor 79 is placed in consideration of the focusing screen 63, permitting, through the imaging lens 72, detection of the luminous flux traveling on the optical path PE. The luminous flux is, specifically, the luminous flux traveling along the optical path PE3 resulting from the change in the travel direction through reflection by the beam splitter 71, more specifically, the reflective surface of the beam splitter 71, after having traveled from the exit side of the pentagonal mirror 65 toward the beam splitter 71. In other words, the photometric sensor 79 is supposed to detect the approximately same light image as the subject image, more specifically, the light image that the subject related to the subject image detected through the viewfinder window 10 is viewed from a slightly different angle or in a somewhat oblique direction. Then, the photometric processing based on the amount of light detected in the photometric sensor 79 is provided properly.

It is noted that during the framing operation with the OVF, the course of the monitoring luminous flux is switched to the optical path PA, so that no imaging of any appropriate subject image is given to the image sensor 7. Thus, no installation of the photometric sensor 79 of the above type results in a difficulty in providing the appropriate photometric processing during the framing operation with the OVF.

The third embodiment (See FIG. 15) attempts to change the optical path PB, more specifically, the travel direction thereof, by providing the beam splitter 71, so that the need for the above backed placement to avoid the interference is eliminated, resulting in a higher degree of freedom in placement. Specifically, the third embodiment attempts to realize the miniaturization, while avoiding the interference between the two imaging lenses 69 and 72 by providing the imaging lens 72 and the photometric sensor 79 on the optical path PE3 resulting from the change in the travel direction, while providing the imaging lens 69 and the image sensor 7 relatively close to the beam splitter 71.

4. Fourth Embodiment

Figure 16:
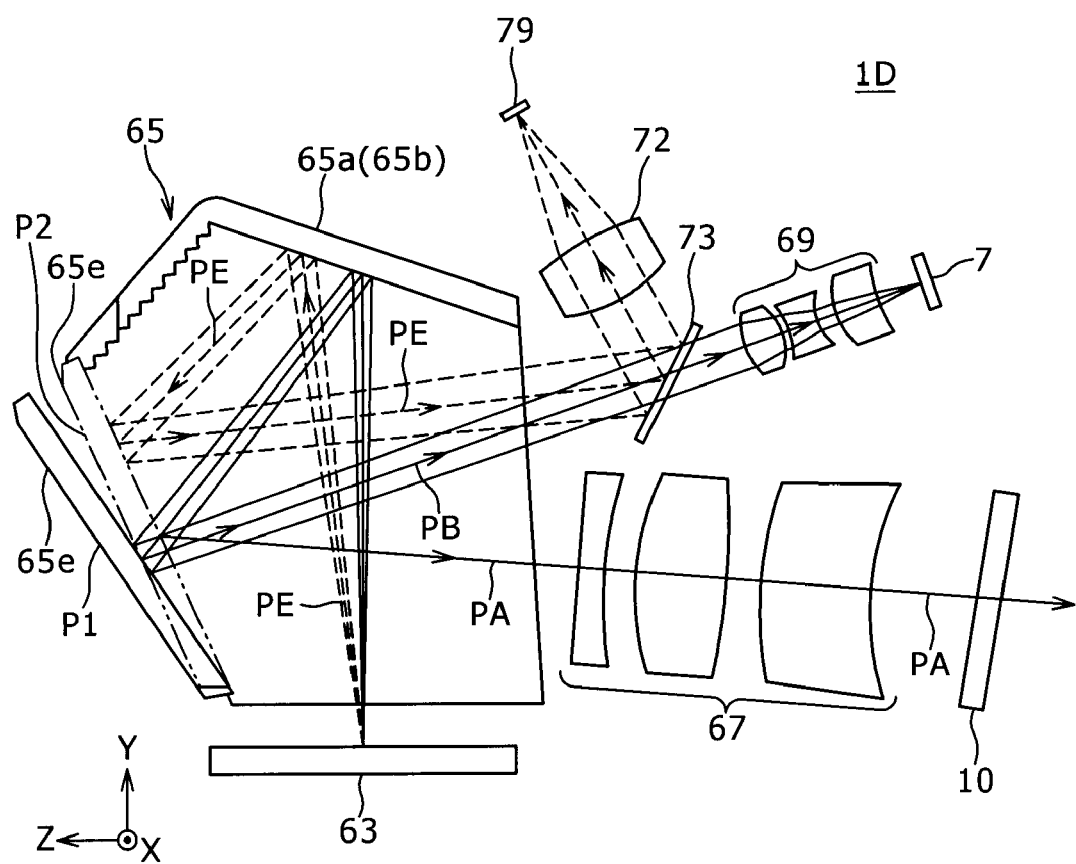
FIG. 16 is a sectional view showing an internal configuration of an imaging apparatus according to a fourth embodiment.

A fourth embodiment relates to a modification of the third embodiment. The following is described with emphasis put on a difference from the third embodiment. FIG. 16 is an enlarged sectional view showing an internal configuration around the pentagonal mirror 65 of an imaging apparatus 1D according to the fourth embodiment.

As shown in FIG. 16, the imaging apparatus 1D is different from the imaging apparatus 1C according to the third embodiment in that the former has a half mirror 73 as a substitute for the beam splitter 71.

The half mirror 73 also provides the same functions as those of the beam splitter 71. For instance, a function of changing the travel direction of the light traveling along the optical path PB during the framing with the EVF, and a function of permitting transmission of the light traveling along the optical path PE during the framing with the OVF are included.

The configuration of this type enables the same effects as those of the third embodiment to be obtained as well.

<5. Other Modifications>

While the embodiments of the present invention have been described in the foregoing, the present invention is not limited to those having the previously described contents.

For instance, while each of the above embodiments has illustrated as related to the case where turning about the lower end-side axis AX1 of the mirror 65e is allowed, but is not limited to the above. It is also allowable to apply a mechanism such as a crank mechanism to change the angle of the mirror 65e by a combination of the turning motion with a parallel displacement. More specifically, the change in the angle of the mirror 65e may be made by moving, in a longitudinal direction of the imaging apparatus 1, a center axis passing through a vertical center of the mirror 65e, while giving the turning about the above center axis.

While each of the above embodiments has illustrated as related to the case where the change in the course of the monitoring luminous flux is made by changing the reflection angle of the mirror 65e specified as the reflective surface other than the dach mirrors 65a and 65b among the reflective surfaces included in the pentagonal mirror 65 of the viewfinder optical system, but is not limited to the above, and it is also allowable to change the course of the monitoring luminous flux by turning the dach mirrors 65a and 65b.

While each of the above embodiments has illustrated as related to the case where the change is made in the reflection angle of a certain reflective surface, i.e., the mirror 65e, among the mirrors 65a, 65b, and 65c included in the viewfinder optical system, whereas the other reflective surface, i.e., the dach mirrors 65a and 65b, are fixed, but is not limited to the above, and it is also allowable to change the course of the monitoring luminous flux by turning more than one reflective surface, for instance.

While each of the above embodiments has illustrated as related to the case where the change in the angle of the mirror 65e is made by making use of physical operating force given by the photographer, in other words, by manual operation, but is not limited to the above, and it is also allowable to change the angle of the mirror such as the mirror 65e by use of a drive apparatus such as motors, for instance.

While each of the above embodiments has illustrated as related to the case where the change in the course of each optical path, PB or PE, is made upwards with the beam splitter 71 or the half mirror 73, but is not limited to the above. For instance, it is also allowable to change the optical path PB in a horizontal direction with the beam splitter 71. In other words, the beam splitter 71 may be adapted to change the travel direction of the monitoring luminous flux to a direction approximately perpendicular to a plane including the optical paths, more specifically, optical axes of both the optical paths immediately before and after the reflection, before and after the reflection from the main mirror 61, or to a direction approximately perpendicular to a sheet plane in FIG. 4. Alternatively, the half mirror 73 may be used to change the travel direction likewise.

While each of the above embodiments has illustrated as related to the case where the application to the digital camera is accepted, but is not limited to the above, and applications to cameras of film-loaded type are also possible. Specifically, the imaging plane of the image sensor 5 has only to be replaced with an imaging plane of a film without providing the image sensor 5.

According to the present invention, it is possible to realize the live viewing without further providing, within the optical path of the viewfinder optical system, the movable reflection mirror movable to and away from the optical path of the viewfinder optical system. It is also possible to provide visual confirmation of the subject image through the optical viewfinder in a brighter condition, as compared to the case where a great decrease in an amount of light reaching the viewfinder window is caused by splitting of the monitoring luminous flux into one component traveling toward the image sensor and the other component traveling toward the viewfinder window using the beam splitter or the half mirror.

Further, according to the present invention, when the course of the monitoring luminous flux takes the second optical path, the photometric processing is performed using the first image sensor, while when the course of the monitoring luminous flux takes the first optical path, the photometric processing is performed using the photometric sensor. Accordingly, the photometric processing is appropriately brought to achievement. Particularly, the photometric sensor or the first image sensor is placed on the optical path resulting from the change in the travel direction with the optical path changing means, enabling a higher degree of freedom in placement to be obtained.

It should be understood by those skilled in the art that various modifications, combinations, sub-combinations and alterations may occur depending on design requirements and other factors insofar as they are within the scope of the appended claims or the equivalents thereof.

Cross References To Related Applications

The present document contains subject matter related to Japanese Patent Application JP 2006-351871 filed in the Japanese Patent Office on Dec. 27, 2006, the entire contents of which being incorporated herein by reference.

What is claimed is:

1. An imaging apparatus, comprising:
   a viewfinder optical system adaptable to guide, toward a viewfinder window, a monitoring luminous flux, which is included in a luminous flux received from an optical imaging system, specifically, a luminous flux having been reflected from a main reflective surface;
   a first image sensor for generating an image signal by detecting the monitoring luminous flux;
   a photometric sensor; and
   optical path changing means adaptable to change an optical path,
   wherein:
   the viewfinder optical system has a first reflective surface that reflects the monitoring luminous flux,
   the first reflective surface is adaptable to change a reflection angle of the monitoring luminous flux,
   a change in the reflection angle of the first reflective surface causes a course of the monitoring luminous flux to be switched between a first optical path reflected from the first main reflective surface toward the viewfinder window and a second optical path reflected from the first reflective surface toward the first image sensor,
   when the course of the monitoring luminous flux takes the second optical path, a travel direction of the second optical path is changed with the optical path changing means placed on the second optical path, causing a photometric processing to be performed using the first image sensor placed on the second optical path resulting from the change in the travel direction, and
   when the course of the monitoring luminous flux takes the first optical path, the photometric processing is performed using the photometric sensor placed in the vicinity of the first optical path.

2. The imaging apparatus according to claim 1, wherein said photometric sensor performs the photometric processing by detecting the luminous flux transmitted through the optical path changing means after having traveled in the vicinity of the first optical path, when the course of the monitoring luminous flux takes the first optical path.

3. The imaging apparatus according to claim 1, wherein the optical path changing means includes a beam splitter.

4. The imaging apparatus according to claim 1, wherein the optical path changing means includes a half mirror.

5. The imaging apparatus according to claim 1, wherein the optical path changing means changes the travel direction of the monitoring luminous flux to a direction approximately perpendicular to a plane including the optical paths before and after reflection from the main reflective surface.

6. The imaging apparatus according to claim 1, wherein the first reflective surface includes one of reflective surfaces included in a pentagonal mirror of the viewfinder optical system.

7. The imaging apparatus according to claim 6, wherein the first reflective surface includes a reflective surface other than roof planes among the reflective surfaces included in the pentagonal mirror of the viewfinder optical system.

8. The imaging apparatus according to claim 7, wherein the first reflective surface may be turned about a lower end-side axis of the first reflective surface.

9. The imaging apparatus according to claim 1, further comprising a second image sensor for generating an image signal by detecting a luminous flux received from the optical imaging system, with the main reflective surface placed in a position of refuge from a shooting optical path.

10. The imaging apparatus according to claim 1, further comprising a display unit for displaying a time-series image acquired by the first image sensor.

11. An imaging apparatus, comprising:
a viewfinder optical system adaptable to guide, toward a viewfinder window, a monitoring luminous flux, which is included in a luminous flux received from an optical imaging system, specifically, a luminous flux having been reflected from a main reflective surface;
a first image sensor for generating an image signal by detecting the monitoring luminous flux;
a photometric sensor; and
optical path changing means adaptable to change an optical path,
wherein:
the viewfinder optical system has a first reflective surface that reflects the monitoring luminous flux,
the first reflective surface is adaptable to change a reflection angle of the monitoring luminous flux,
a change in the reflection angle of the first reflective surface causes a course of the monitoring luminous flux to be switched between a first optical path reflected from the first main reflective surface toward the viewfinder window and a second optical path reflected from the first reflective surface toward the first image sensor,
when the course of the monitoring luminous flux takes the first optical path, a photometric processing is performed using the photometric sensor adapted to detect the luminous flux whose travel direction has been changed with the optical path changing means placed in the vicinity of the first optical path, and
when the course of the monitoring luminous flux takes the second optical path, the photometric processing is performed using the first image sensor placed on the second optical path.

12. The imaging apparatus according to claim 11, wherein the first image sensor performs a photometric processing by detecting the luminous flux transmitted through the optical path changing means, when the course of the monitoring luminous flux takes the second optical path.

13. The imaging apparatus according to claim 11, wherein the optical path changing means includes a beam splitter.

14. The imaging apparatus according to claim 11, wherein the optical path changing means includes a half mirror.

15. The imaging apparatus according to claim 11, wherein the optical path changing means changes the travel direction of the monitoring luminous flux to a direction approximately perpendicular to a plane including the optical paths before and after reflection from the main reflective surface.

16. The imaging apparatus according to claim 11, wherein the first reflective surface includes one of reflective surfaces included in a pentagonal mirror of the viewfinder optical system.

17. The imaging apparatus according to claim 16, wherein the first reflective surface includes a reflective surface other than roof planes among the reflective surfaces included in the pentagonal mirror of the viewfinder optical system.

18. The imaging apparatus according to claim 17, wherein the first reflective surface may be turned about a lower end-side axis of the first reflective surface.

19. The imaging apparatus according to claim 11, further comprising a second image sensor for generating an image signal by detecting a luminous flux from the optical imaging system, with the main reflective surface placed in a position of refuge from a shooting optical path.

20. The imaging apparatus according to claim 11, further comprising a display unit for displaying a time-series image acquired by the first image sensor.

* * * * *